July 18, 1933. A. S. FITZ GERALD 1,919,182
PHOTO-ELECTRIC SYSTEM
Filed June 4, 1931
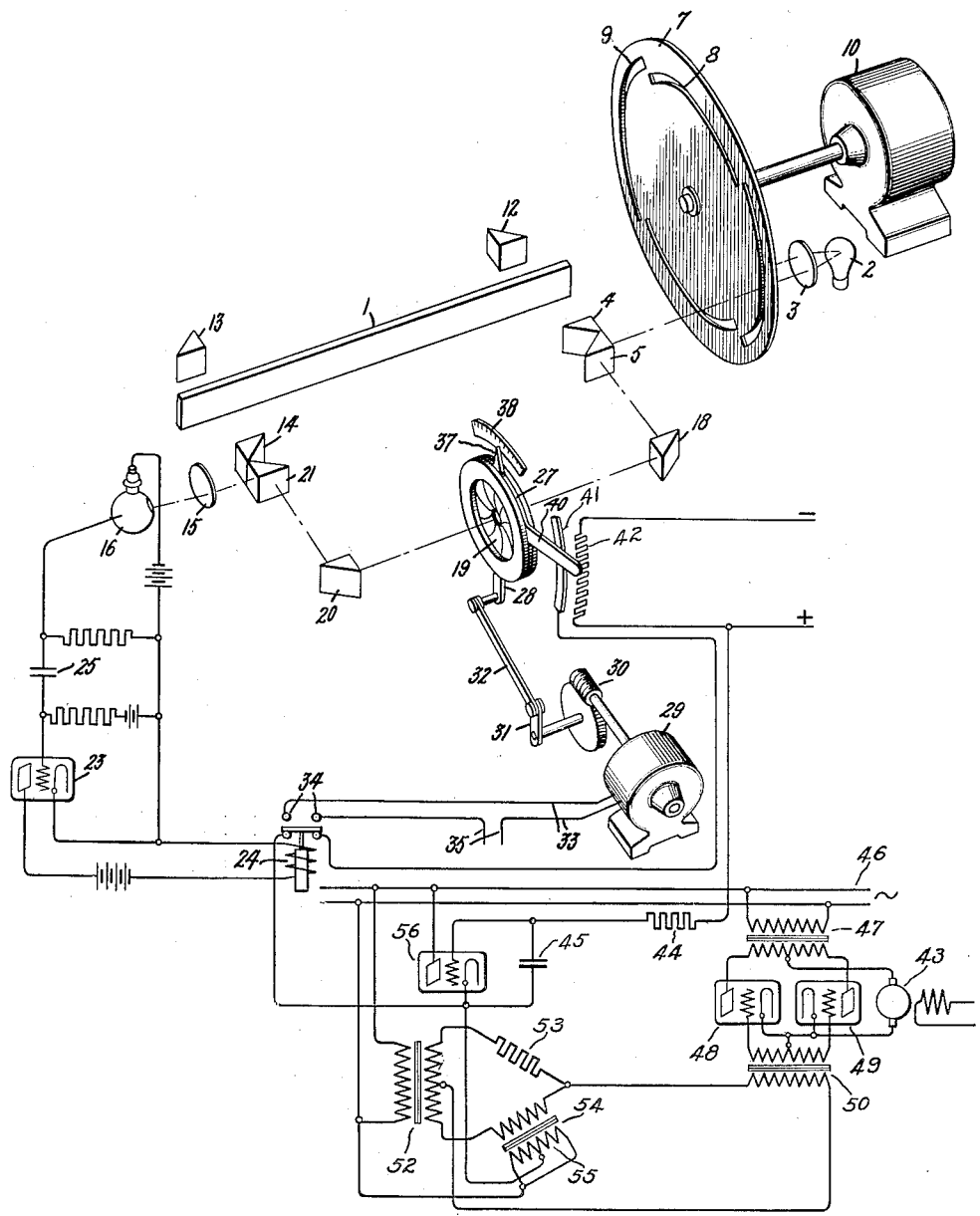
Inventor:
Alan S. FitzGerald,
by Charles N. Mullen
His Attorney.

Patented July 18, 1933

1,919,182

UNITED STATES PATENT OFFICE

ALAN S. FITZ GERALD, OF WYNNEWOOD, PENNSYLVANIA, ASSIGNOR TO GENERAL ELECTRIC COMPANY, A CORPORATION OF NEW YORK

PHOTO-ELECTRIC SYSTEM

Application filed June 4, 1931. Serial No. 542,185.

My invention relates to systems employing photo-electric devices for making a measurement or for controlling a device in accordance with the light received from some particular material. It is the object of my invention to provide an improved system of this character which is simple in construction, reliable in operation and inexpensive to manufacture.

In accordance with my invention I direct alternately into a photo-electric device a plurality of light beams one of which is received from the material, for example by reflection therefrom or by transmission therethrough, and another of which is varied by a movable controlling device. Electric impulses received from the photo-electric device due to a difference of the light beams reaching it after being amplified are caused to operate a device such as a relay whenever the inequality of the impulses due to the separate beams are in excess of a predetermined minimum. By providing the movable controlling device with indicating means the position of the device may be read when it reaches the point at which the relay is no longer operated. I also provide means such as a motor under the control of the relay for slowly moving the controlling device as long as the relay is operated, which device may be arranged to control other apparatus in accordance with its position.

My invention will be better understood from the following description taken in connection with the accompanying drawing, and its scope will be pointed out in the appended claims.

In the single figure of the drawing which illustrates an embodiment of my invention, I have shown an arrangement whereby the transparency of a material may be measured and caused to control other apparatus. Although this material is illustrated as comprising the bar 1, it will be understood that the material may be a liquid, a semi-transparent gas or column of smoke or may be an opaque body from which light is received by reflection. The source of light for the two beams is shown as comprising a lamp 2, the light from which is projected in a beam of parallel rays by the lens 3 to the prisms 4 and 5. Any suitable means may be employed to cause the light from the source 2 to be directed alternately upon the prisms 4 and 5. In the particular form which I have illustrated this is accomplished by means of the disc 7 having inner and outer slots 8 and 9 respectively formed therein through which the light may pass respectively to the prisms 4 and 5. The disc 7 may be driven by any suitable means, such for example as the electric motor 10. The beam of light which reaches the prism 4 is reflected thereby through the material 1 to the prism 12 thence to the prism 13 and again through the material 1 to the prism 14 where it is reflected through lens 15 into the window of the photo cell 16. The beam of light which reaches prism 5 is reflected thereby to prism 18 thence through the iris diaphragm 19 to prism 20 from which it is again reflected to prism 21, and finally through lens 15 into the photo cell 16. The output current of the cell 16 after being amplified, for example by the thermionic amplifier 23, is connected to operate the relay 24. The connection between the cell 16 and the amplifier includes suitable means whereby only the alternating current component of the current passing through the cell is detected or amplified by the amplifier. In the form illustrated this means is shown comprising the condenser 25. The grid of the amplifier also is so biased that when the two beams are substantially equal and the current from the cell is uniform the relay opens the circuit of motor 29. If the setting of the diaphragm 19 happens to be such that the light reaching the cell 16 from each of the two beams passing respectively through the material 1 and the diaphragm produces equal effects on the cell, the ripple or alternating current component therefrom will be substantially zero. Hence the current supplied to the relay 24 will have a minimum or zero value. Such an accidental setting of the diaphragm will not ordinarily occur. I shall now describe means whereby the setting of the diaphragm is automatically changed so that such equality in the light beams shall obtain.

In accordance with the common construction of iris diaphragms the diaphragm 19 is shown having a rotatable outer ring 27 provided with the arm 28 by which it may be rotated to change the setting. Arm 28 is connected to be oscillated through a suitable angle to cause the diaphragm to open and close by means of the electric motor 29 which through the worm gear 30 operates crank 31 connected by link 32 to the arm 28. Motor 29 is connected by the leads 33 with the contacts 34 of relay 24 and by the leads 35 with a suitable source of current. The ring 27 of the diaphragm is also provided with the pointer 37 arranged to cooperate with the scale 38. This scale may be suitably graduated to read in terms of transparency of the material 1 or if the material is opaque it may be graduated to read in terms of reflecting power.

In addition to means for indicating the position of the diaphragm I have provided means whereby the diaphragm may control the operation of other apparatus which, for example, in the event that the member 1 is a column of smoke or fumes, may operate ventilating apparatus. For this purpose I have provided the ring 27 of the iris diaphragm with the contact arm 40 which is arranged to slide over the contact 41 and the resistance 42, the arm thereby forming the movable contact of a potentiometer, the ends of the resistance being connected respectively to the positive and negative terminals of a source of direct current as indicated. Through the instrumentality of apparatus comprising a phase shifting network now to be described, a form of which is disclosed and claimed in my Patent No. 1,893,768, granted January 10, 1933, and assigned to the same assignee as my present application, contact arm 40 by its position controls the speed of the motor 43 which as indicated above may operate ventilation apparatus, pumps or delivery apparatus. In circuit with the arm 40 and resistance 42 is the resistance 44, condenser 45 and the back contacts of relay 24 whereby when the relay is in its deenergized position the condenser is charged in proportion to the position of the contact arm 40. By connecting this condenser so as to be charged through the back contacts of relay 24, the motor regulating apparatus described below is not required to follow the hunting movements of the diaphragm prior to its arriving at its final position.

The armature of motor 43 is shown fed from the a. c. supply circuit 46 through the transformer 47 and valves 48 and 49, each of which has an anode, a cathode and a grid and which may be of any well known type, although I prefer to employ for this purpose vapor electric discharge devices. The control grids of valves 48 and 49 connect with their common cathode circuit through opposite halves of the secondary winding of grid transformer 50. In order to control the phase relation of the output circuit of valves 48 and 49 and hence the speed of motor 43 in accordance with the charge of condenser 45, the primary winding of grid transformer 50 is energized from an impedance phase shifting circuit comprising the transformer 52, the primary winding of which is connected to the supply circuit 46 and the secondary of which connects across the resistance 53 and saturable reactor 54. This reactor is provided with the saturating winding 55 energized from the supply circuit 46 through the valve 56 which preferably is a three-electrode high vacuum pure electron discharge device. The grid of valve 56 is excited with the potential across the condenser 45.

The operation of the apparatus it is believed will be obvious from the above description and has already been indicated. Unless the two beams of light entering the photocell and passing respectively through material 1 and the iris diaphragm produce equal effects on the cell, the current output of the cell will have an alternating component of a frequency determined by the passage of the openings 8 and 9 of disc 7. The relay 24 thereby will be operated to close the circuit of motor 29 which in turn will continue slowly to change the setting of the diaphragm until it reaches that point at which the two light beams produce equal effects upon the cell when the alternating current output of the cell is reduced to a predetermined minimum at which the relay 24 opens the circuit of motor 29. The position of pointer 37 on scale 38 then indicates the transparency of the material 1. If material 1 is of changeable transparency, as for example the smoke or fumes in a chimney, the diaphragm 19 will reach a condition of rest after each change in the light conditions of member 1 and the relay 24 having been deenergized allows the closing of its back contacts when the phase shifting apparatus becomes operative to cause the motor 43 to be driven at a predetermined speed in accordance with the charge on condenser 45 which is governed by the final position of the diaphragm. In the above apparatus I have shown the potentiometer arrangement for controlling the charge of condenser 45 merely as illustrative of some means for this purpose. In order to reduce the friction of the sliding contacts I may in certain cases prefer to employ various other means which offer less resistance to the movement. When the arm 40 of the potentiometer moves upward thereby including more of the resistance 42 in the circuit of the capacitor 45 the capacitor receives a greater charge which acting upon the grid of valve 56 produces a greater current flow in the direct current saturating winding 55 of the saturable reactor 54. The resulting increase in saturation of reactor 54 reduces the inductive reactance thereof whereby the current fed to the primary of the grid transformer 50 has its phase angle advanced; hence bringing closer together the voltage and current waves in the output circuit of valves 48 and 49 with the final result that motor 43 will operate at an increased speed. This part of the apparatus functions in a manner similar to that of the Zucker Patent 1,851,692 March 29, 1932.

While I have shown and described the diaphragm 19 as being of the iris type, it will be understood that this diaphragm may be of any suitable construction having a movable element for governing the transmission of the light constituting one of the beams.

Among the many advantages of the apparatus described above and comprising my invention it is to be noted that the operation of the apparatus is independent of variations in the intensity of the light source, is independent of variations in the characteristics of the photo-cell employed, is independent of variations in the speed of the motor driving the disk and the apparatus does not require the use of synchronously rotating parts.

I have chosen the particular embodiment described above as illustrative of my invention and it will be apparent that various other modifications may be made without departing from the spirit and scope of my invention, which modifications I aim to cover by the appended claims.

What I claim as new and desire to secure by Letters Patent of the United States, is:

1. Apparatus responsive to the light characteristics of a material comprising a photo-electric device, means for directing into said device alternately a plurality of light beams, one of said beams being arranged to be controlled by said material, movable means for controlling another of said beams in accordance with its position, means controlled by said device for varying the position of said movable means, a motor and means for varying the speed thereof in accordance with the position of the movable means.

2. Apparatus responsive to the light characteristics of a material comprising a photo-electric device, means for directing into said device alternately a plurality of light beams, one of said beams being arranged to be controlled by said material, a diaphragm arranged in the path of another of said beams, means controlled by said device for adjusting said diaphragm to variably intercept said other beam, a potentiometer controlled by said diaphragm, a motor, and speed control means therefor responsive to said potentiometer.

ALAN S. FITZ GERALD.